Jan. 23, 1934.  F. REPECK  1,944,612
DIFFERENTIAL CARRIER
Filed Aug. 10, 1932
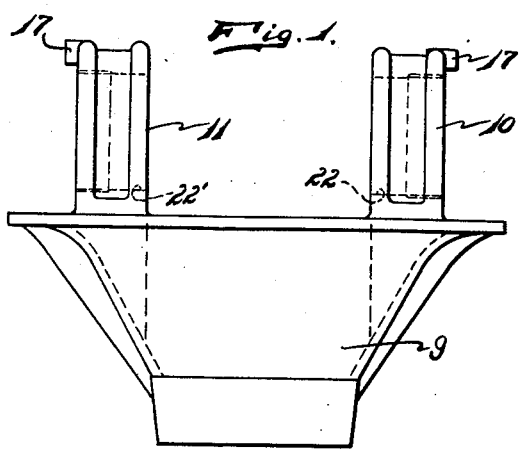
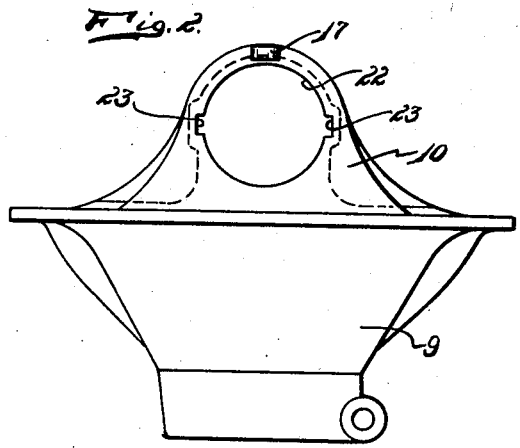
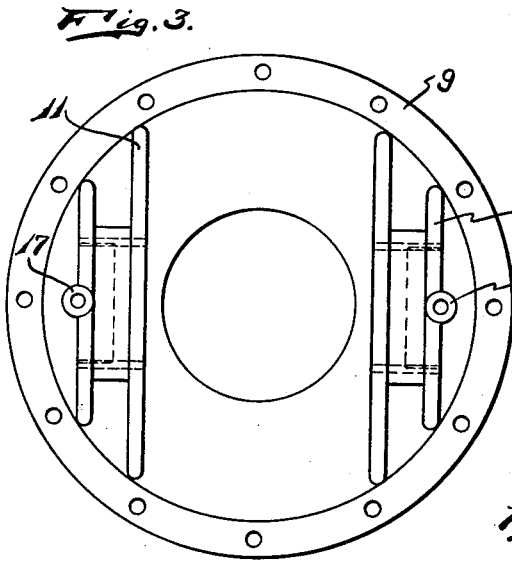
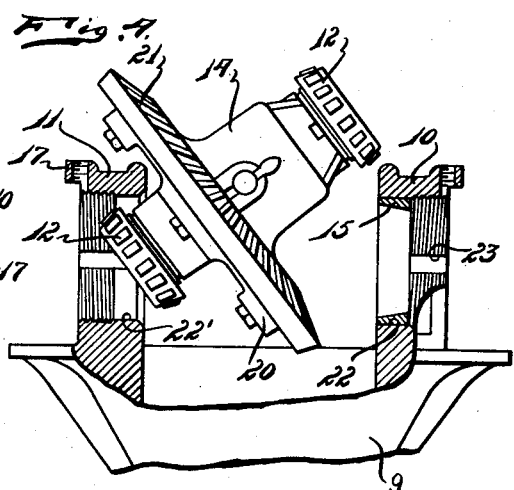
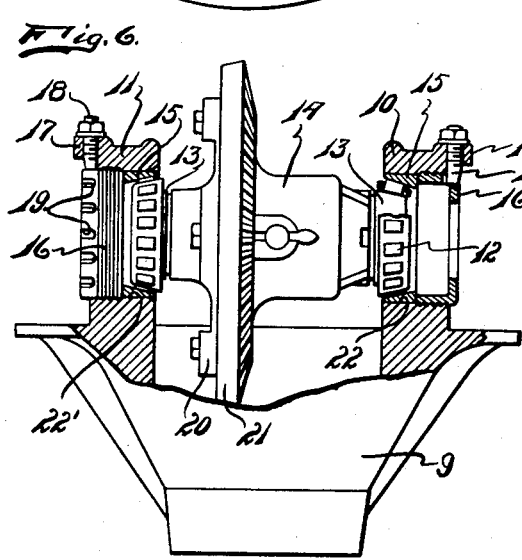
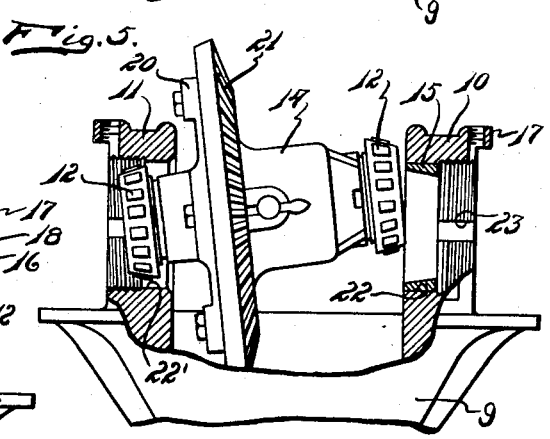
INVENTOR.
FRANK REPECK
BY
Thos. Donnelly
ATTORNEY.

Patented Jan. 23, 1934

1,944,612

UNITED STATES PATENT OFFICE 1,944,612

DIFFERENTIAL CARRIER

Frank Repeck, Detroit, Mich.

Application August 10, 1932. Serial No. 628,209

2 Claims. (Cl. 74—99)

My invention relates to a new and useful improvement in a differential carrier and has for its object the provision of a carrier in which a differential in assembled form may be easily and quickly mounted in position and removed therefrom.

Another object of the invention is the provision of a carrier which will permit the assembling of the differential therein after the bearings have been mounted on the differential so that the centering of the bearings and the ring gear need not be disturbed for the purpose of assembling the same in the carrier, thus permitting the differential to remain in the same assembled form in which it was arranged for the machining of the flange which carries the ring gear.

Another object of the invention is the provision of a carrier of this class which will be simple in structure, economical of manufacture, durable and highly efficient in use.

Other objects will appear hereinafter.

The invention consists in the combination and arrangement of parts hereinafter described and claimed.

The invention will be best understood from the accompanying drawing which forms a part of this specification and in which, Fig. 1 is a side elevational view of the carrier, Fig. 2 is an end elevational view of the carrier, Fig. 3 is a top plan view of the carrier, Fig. 4 is a central sectional view of the carrier showing the differential in assembled form in the first position of insertion into the carrier, Fig. 5 is a view similar to Fig. 4 showing a further progression of the inserting movement, and, Fig. 6 is a central sectional view of the carrier with the differential in position therein.

The carrier comprises the main body 9 projecting upwardly from which are the standards 10 and 11 each of which is provided with a circular opening which serves as a journal for the bearings 12 which are mounted on the trunnions 13 which project outwardly from the differential housing 14. These bearings 12 are of the cone type and are adapted to be engaged by the bearing cone 15 which embraces the same and which is positioned in the opening 22 or 22' of the standard 10 or 11. The outer portion of the opening 22 and 22' are threaded for the reception of the adjusting ring 16 which is threaded therein and which is adapted to engage the outer surface of the bearing cone 15 and maintain the same in proper position relative to the bearing 12. A lock screw 18 is threaded through the lug 17 formed on the standard 10 or 11 and adapted to engage in one of the spaced openings 19 so as to prevent undue reverse rotation of the adjusting ring.

The differential housing 14 is provided with a flange 20 to one face of which is secured the ring gear 21. This flange is machined while the bearings are in position on the trunnions 13 so that the ring gear is centered relatively to these bearings. Should it be necessary to remove the bearings for the insertion of the differential into the carrier and then to again place the bearings 12 in position the centering which would have been obtained during the machining operation would have been lost and it would be practically impossible to center the bearings and the ring gear relatively to each other while the parts are in the carrier. The present invention avoids this difficulty by making it possible to place the differential in the carrier while the bearings are in the same position they were while the machining operation was being performed. To accomplish this it is necessary to maintain a definite relation between the various parts and particularly between the spacing between the standard 10 and 11, the distance between the bearings and the location of the ring gear.

In mounting the differential in the carrier the differential is tilted until the bearing to be supported in the standard or journal 11 has been inserted in the opening 22'. The opposite bearing will then clear the opposite standard and the differential may be lowered into position between the standards 10 and 11 to permit the bearing 12 to be thrust into the opening 22 and then engaged by cones which are later inserted into the openings 22 and 22'. The adjusting rings are then screwed into position and the lock screw moved into locking position. Thus there is provided a device whereby the differential is mounted in position without disturbing the centered bearings 12 with the ring gear in assembled position. It will also be noted that the standards 10 and 11 each comprise a full circle or uninterrupted ring free from any cut away portions opening through the periphery, while at the same time the end caps commonly used are dispensed with. Thus the bearing cones are in engagement throughout their peripheries with the journals in which they are positioned and a durable structure is thus provided which permits of the utmost simplicity of structure and ease and speed in assembly.

On account of the relative structure of the various parts there is a method of assembly which is important and which forms a part of the present invention.

The axially extending grooves 23 permit the insertion of a suitable tool when it is desired to disassemble the device so that the bearing cones may be removed from operation position.

While I have illustrated and described the preferred form of construction I do not wish to limit myself to the precise details of structure shown but desire to avail myself of such modifications and variations as may come within the scope of the appended claims.

Having thus described my invention, what I claim as new and desire to secure by Letters Patent is:

1. In combination, a differential housing; a trunnion projecting outwardly from opposite sides of said housing; a bearing fixedly mounted on said trunnion; a ring gear carried by and embracing said housing and centered relatively to said bearings; a differential carrier body; a pair of spaced standards projecting outwardly from one face of said body, each of said standards having an opening formed therein, said standards being spaced apart sufficiently for providing journals for said bearings; the openings in said standards presenting an uninterrupted circular surface for engaging its bearing, said standards being spaced apart sufficiently for permitting the insertion of said differential in position thereon without requiring the removal of the ring gear or bearings.

2. In combination, a differential housing; a trunnion projecting outwardly from opposite sides of said housing; a bearing fixedly mounted on each of said trunnions; a ring gear carried by and embracing said housing, said ring gear and said bearings being centered relatively to each other; a differential carrier body; a pair of spaced standards projecting outwardly from one face of said body, each of said standards having an opening formed therein for providing a journal for one of said bearings, the openings in said standards presenting an uninterrupted circular surface for engaging the bearing, said standards being spaced apart sufficiently for permitting the insertion of said differential in position thereon without requiring the removal of the ring gear or either of the bearings; and means insertable in each of said openings for preventing axial movement of said housing relatively to said standard.

FRANK REPECK.